US012149986B2

(12) United States Patent
Kim

(10) Patent No.: US 12,149,986 B2
(45) Date of Patent: Nov. 19, 2024

(54) METHOD AND APPARATUS FOR QOE REPORTING IN A WIRELESS COMMUNICATION SYSTEM

(71) Applicant: LG ELECTRONICS INC., Seoul (KR)

(72) Inventor: Sangwon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 317 days.

(21) Appl. No.: 17/674,696

(22) Filed: Feb. 17, 2022

(65) Prior Publication Data

US 2022/0264373 A1    Aug. 18, 2022

(51) Int. Cl.
*H04W 28/24* (2009.01)
*H04W 24/10* (2009.01)
*H04W 76/30* (2018.01)

(52) U.S. Cl.
CPC .......... *H04W 28/24* (2013.01); *H04W 24/10* (2013.01); *H04W 76/30* (2018.02)

(58) Field of Classification Search
CPC ............. H04W 28/0268; H04W 24/10; H04W 28/0942; H04W 28/0284; H04W 28/0992; H04W 24/04; H04W 76/30; H04W 28/24; Y02D 30/70
See application file for complete search history.

(56) References Cited

U.S. PATENT DOCUMENTS

| 11,245,626 B2 * | 2/2022 | Wang | H04L 47/12 |
| 2018/0035438 A1 * | 2/2018 | Pao | H04W 72/21 |
| 2022/0225142 A1 * | 7/2022 | Li | H04W 36/0058 |
| 2022/0279385 A1 * | 9/2022 | Johansson | H04W 28/0942 |
| 2022/0417780 A1 * | 12/2022 | Liu | H04W 28/0268 |
| 2023/0308925 A1 * | 9/2023 | Hu | H04B 17/309 |
| 2023/0318941 A1 * | 10/2023 | Rune | H04L 41/5009 370/252 |
| 2023/0388829 A1 * | 11/2023 | Eklöf | H04L 41/0895 |
| 2023/0388830 A1 * | 11/2023 | Eklöf | H04W 36/0085 |
| 2024/0064530 A1 * | 2/2024 | Parichehrehteroujeni | H04W 24/08 |
| 2024/0089819 A1 * | 3/2024 | Lunardi | H04W 36/0069 |

(Continued)

OTHER PUBLICATIONS

3rd Generation Partnership Project (3GPP), "Technical Specification Group Radio Access Network; Evolved Universal Terrestrial Radio Access (E-UTRA); Radio Resource Control (RRC); Protocol specification (Release 16)," Section 5.6.19 of 3GPP TS 36.331 V16.3.0, Dec. 2020, 1014 pages.

(Continued)

*Primary Examiner* — Jung Liu
(74) *Attorney, Agent, or Firm* — LEE, HONG, DEGERMAN, KANG & WAIMEY

(57) ABSTRACT

A method and apparatus for QoE reporting in a wireless communication system is provided. A wireless device may receive, from the RAN node, first information related to a specific QoE configuration among the one or more QoE configurations. The first information may inform to suspend QoE reporting associated with the specific QoE configuration. The wireless device may suspend the QoE measurement reporting associated with the specific QoE configuration. The wireless device may store measurement results associated with the specific QoE configuration.

12 Claims, 13 Drawing Sheets

(56) References Cited

U.S. PATENT DOCUMENTS

2024/0098532 A1* 3/2024 Rune .................... H04W 24/08

OTHER PUBLICATIONS

3rd Generation Partnership Project (3GPP), "Technical Specification Group Radio Access Network; Evolved Universal Terrestrial Radio Access (E-UTRA); Radio Resource Control (RRC); Protocol specification (Release 16)," Section 6.3.6 of 3GPP TS 36.331 V16.3.0, Dec. 2020, 1014 pages.

3rd Generation Partnership Project (3GPP), "Technical Specification Group Radio Access Network; Evolved Universal Terrestrial Radio Access (E-UTRA); Radio Resource Control (RRC); Protocol specification (Release 16)," Section 6.2.2 of 3GPP TS 36.331 V16.3.0, Dec. 2020, 1014 pages.

* cited by examiner

METHOD AND APPARATUS FOR QOE REPORTING IN A WIRELESS COMMUNICATION SYSTEM

CROSS-REFERENCE TO RELATED APPLICATION(S)

Pursuant to 35 U.S.C. § 119(a), this application claims the benefit of earlier filing date and right of priority to Korean Patent Application No. 10-2021-0022012, filed on Feb. 18, 2021, the contents of which are hereby incorporated by reference herein in its entirety.

BACKGROUND

Technical Field

The present disclosure relates to a method and apparatus for QoE reporting in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

SUMMARY

Technical Objects

In NR, Quality of Experience (QoE) measurement may be supported. QoE measurement is an application layer measurement configured by Operations, Administration and Maintenance (OAM). QoE report is the result of a QoE measurement.

The QoE reporting has lower priority than other uplink signalling. However, the QoE reporting can be triggered very frequently, since UE can be configured with multiple QoE measurements. Considering that each QoE result can be up to 8000 bits, the QoE reporting needs to be suspended when the overload happens in RAN. If so, the QoE consumer cannot acquire the QoE results measured while the QoE reporting is suspended.

Therefore, studies for QoE reporting in a wireless communication system are required.

Technical Solutions

In an aspect, a method performed by a wireless device in a wireless communication system is provided. A wireless device may receive, from the RAN node, first information related to a specific QoE configuration among the one or more QoE configurations. The first information may inform to suspend QoE reporting associated with the specific QoE configuration. The wireless device may suspend the QoE measurement reporting associated with the specific QoE configuration. The wireless device may store measurement results associated with the specific QoE configuration.

In another aspect, an apparatus for implementing the above method is provided.

Technical Effects

The present disclosure can have various advantageous effects.

According to some embodiments of the present disclosure, a wireless device could perform QoE reporting efficiently.

In particular, a wireless device could efficiently suspend the QoE reporting by logging QoE measurement results.

That is, a wireless device could log the measurement results depending on the service type or priority of the configured measurements, when overload happens in RAN.

Therefore, the network or service provider can acquire the measurement results measured during the RAN overload.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
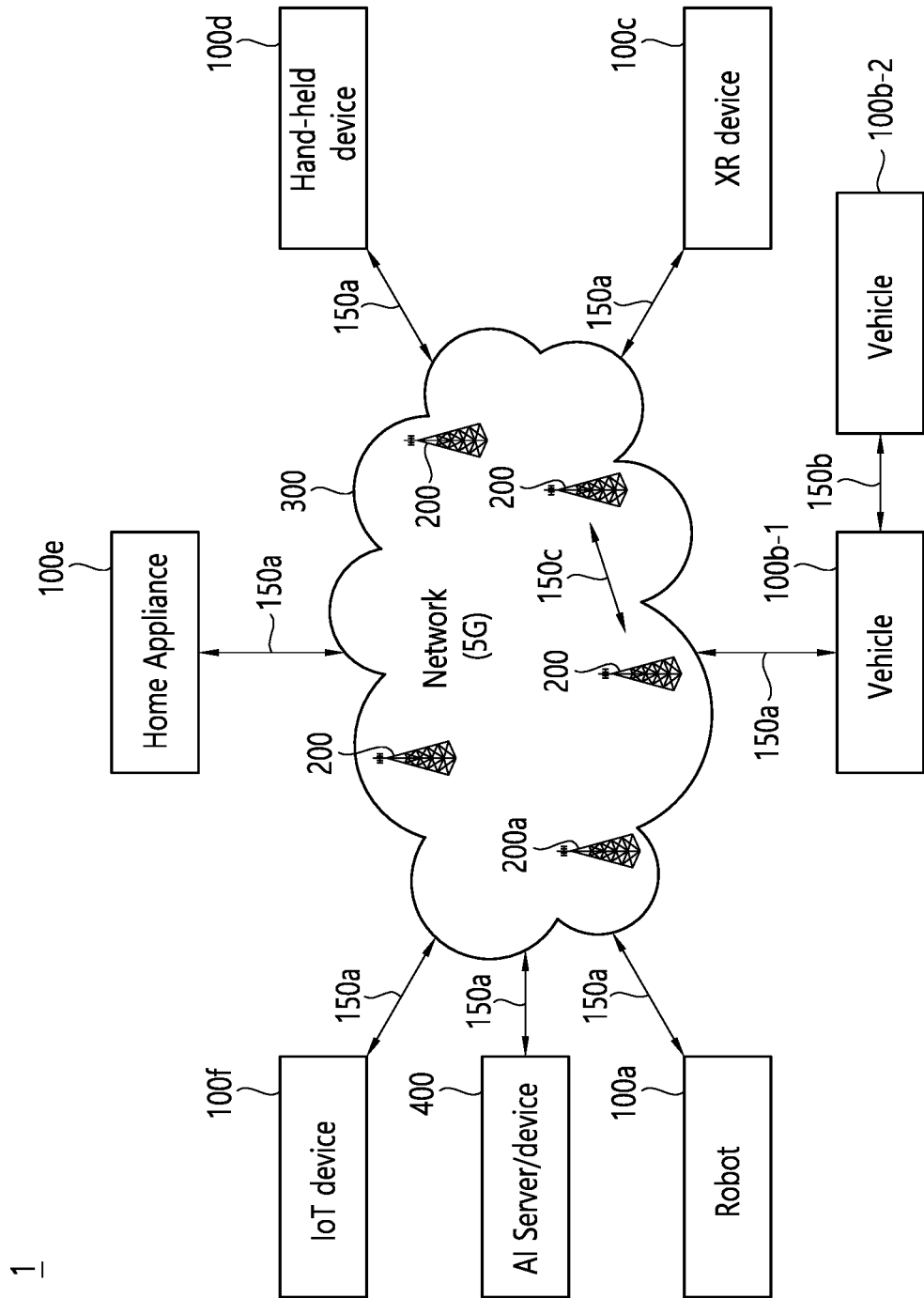
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the abovementioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4)

LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
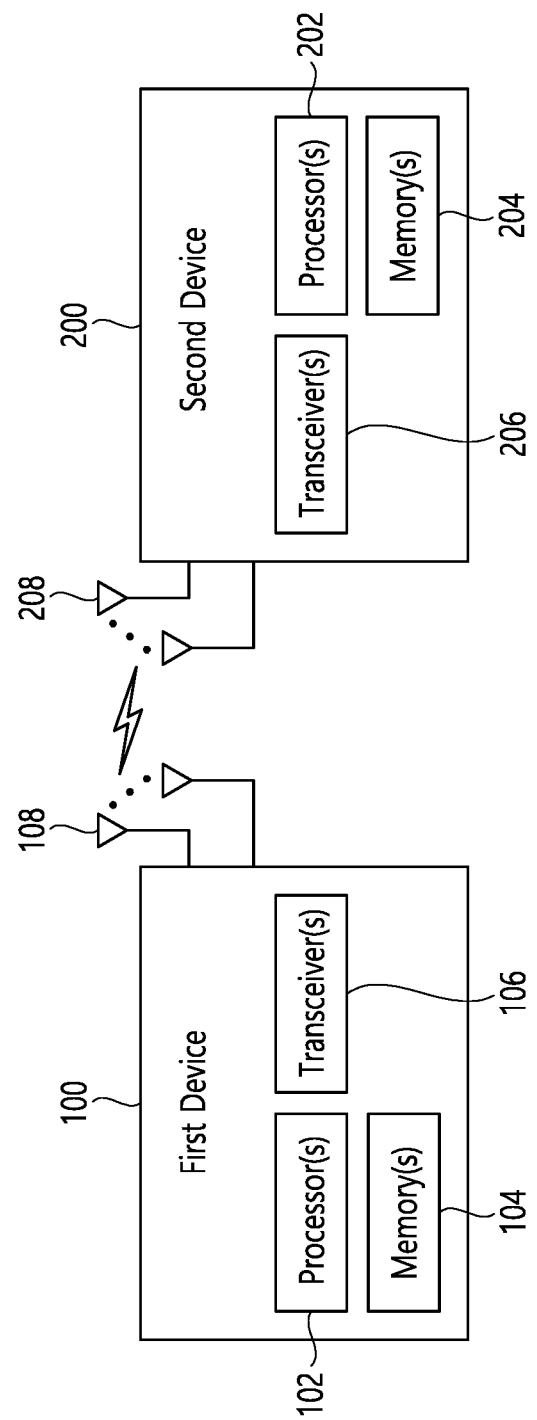
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
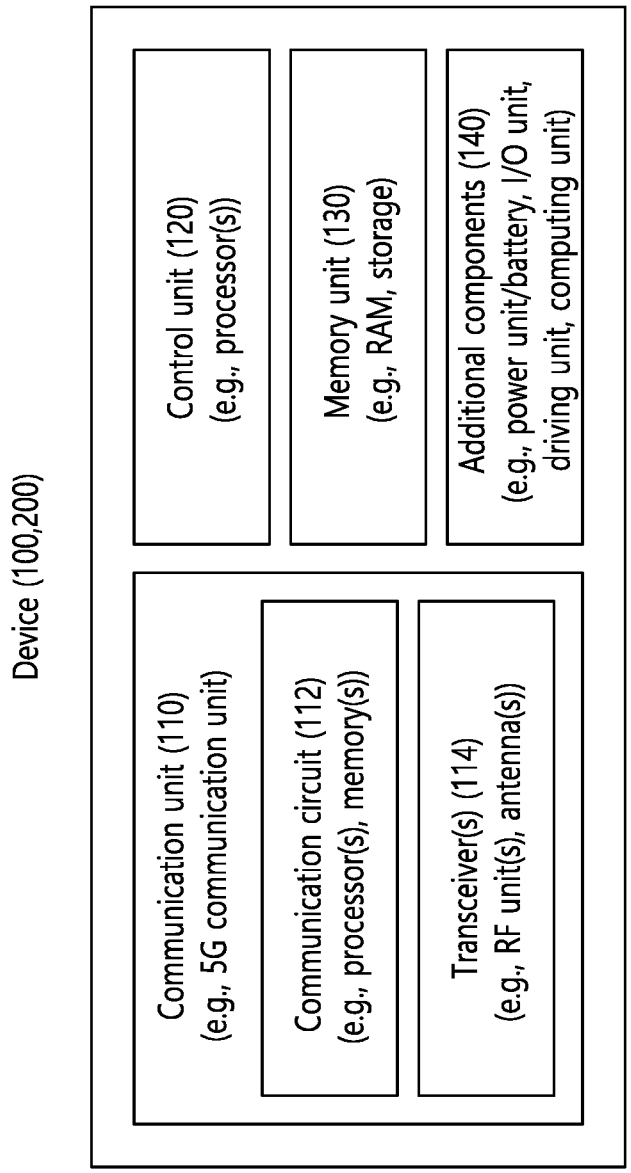
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
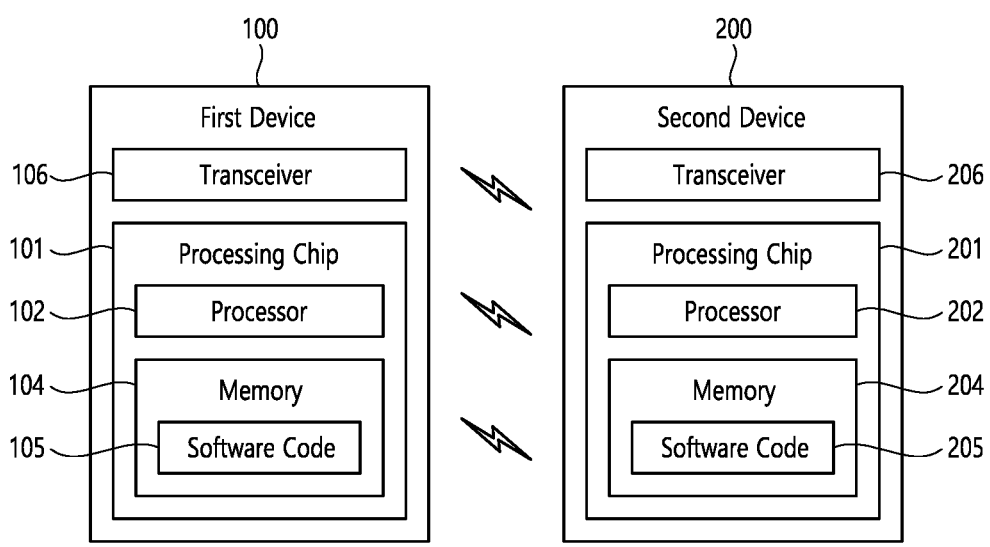
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
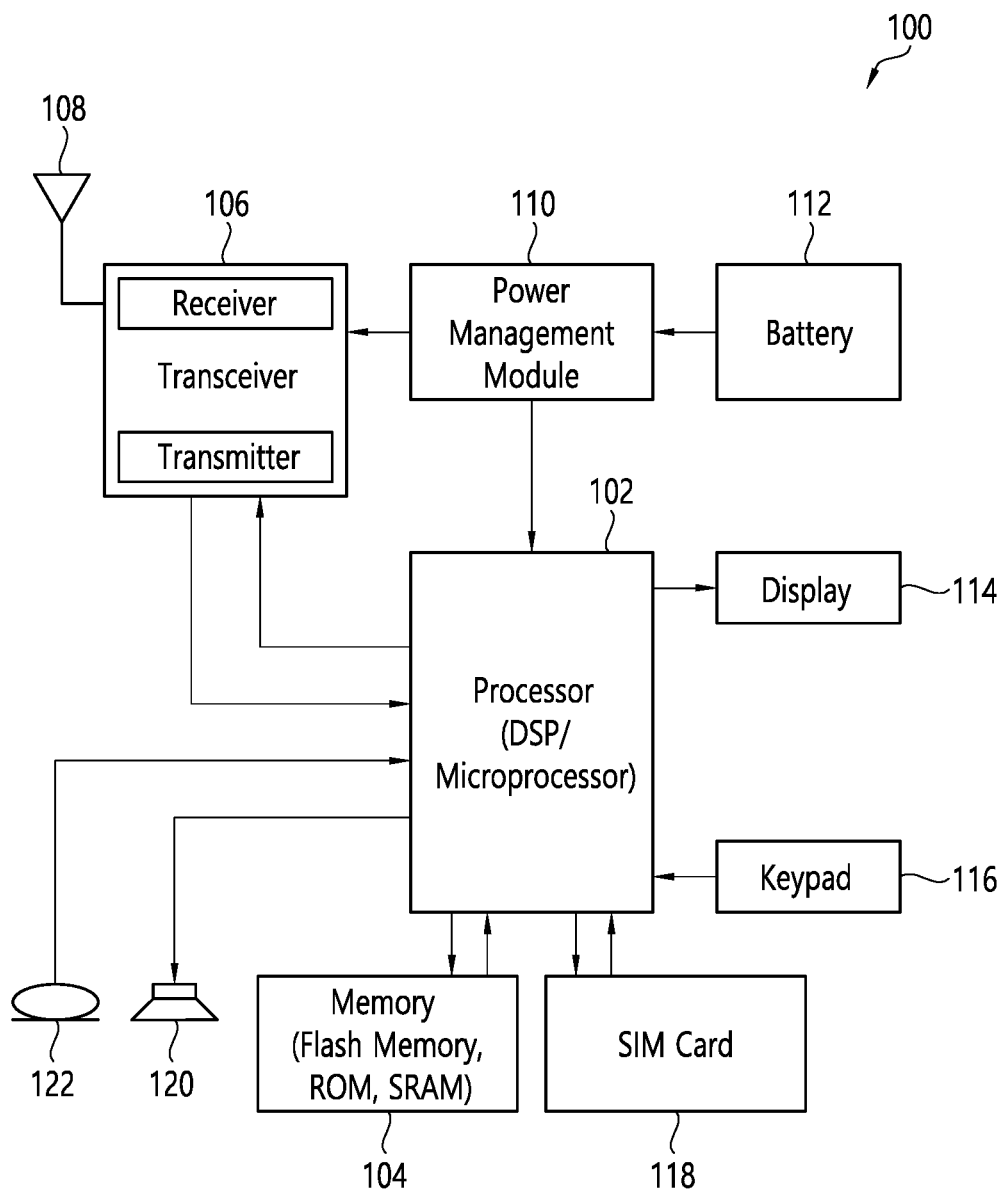
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 6:
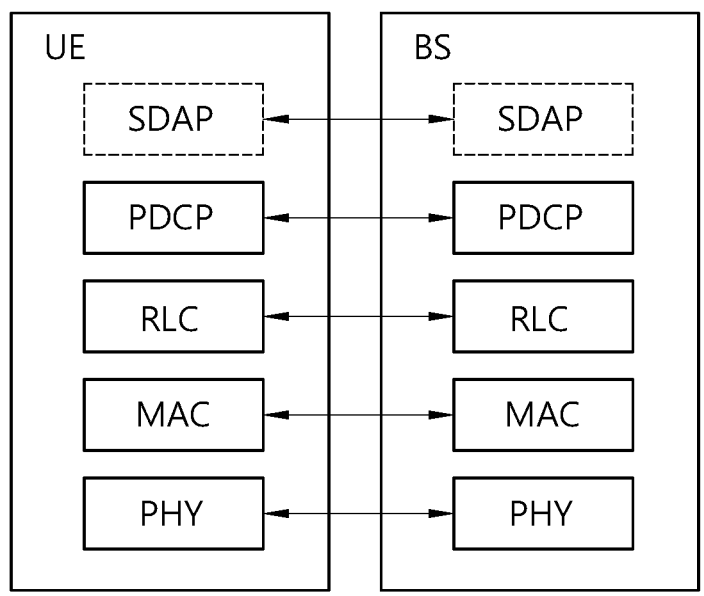
FIGS. 6 and 7 show an example of protocol stacks in a 3GPP based wireless communication system to which implementations of the present disclosure is applied.
Figure 7:
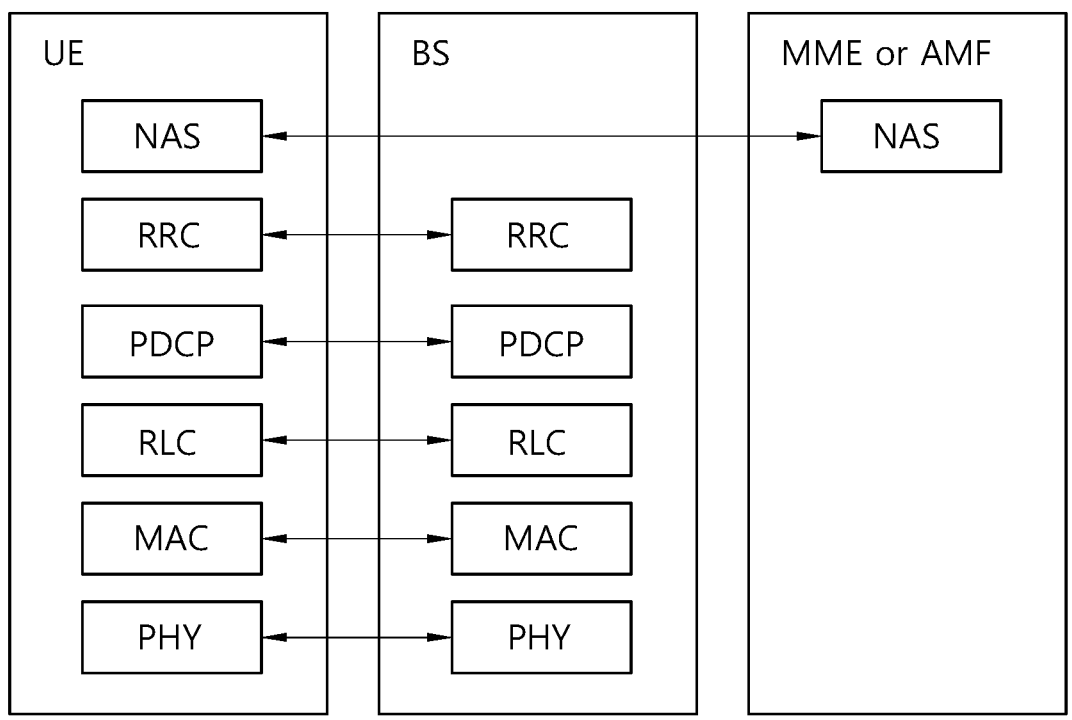

FIGS. 6 and 7 show an example of protocol stacks in a 3GPP based wireless communication system to which implementations of the present disclosure is applied.

In particular, FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information.

Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 8:
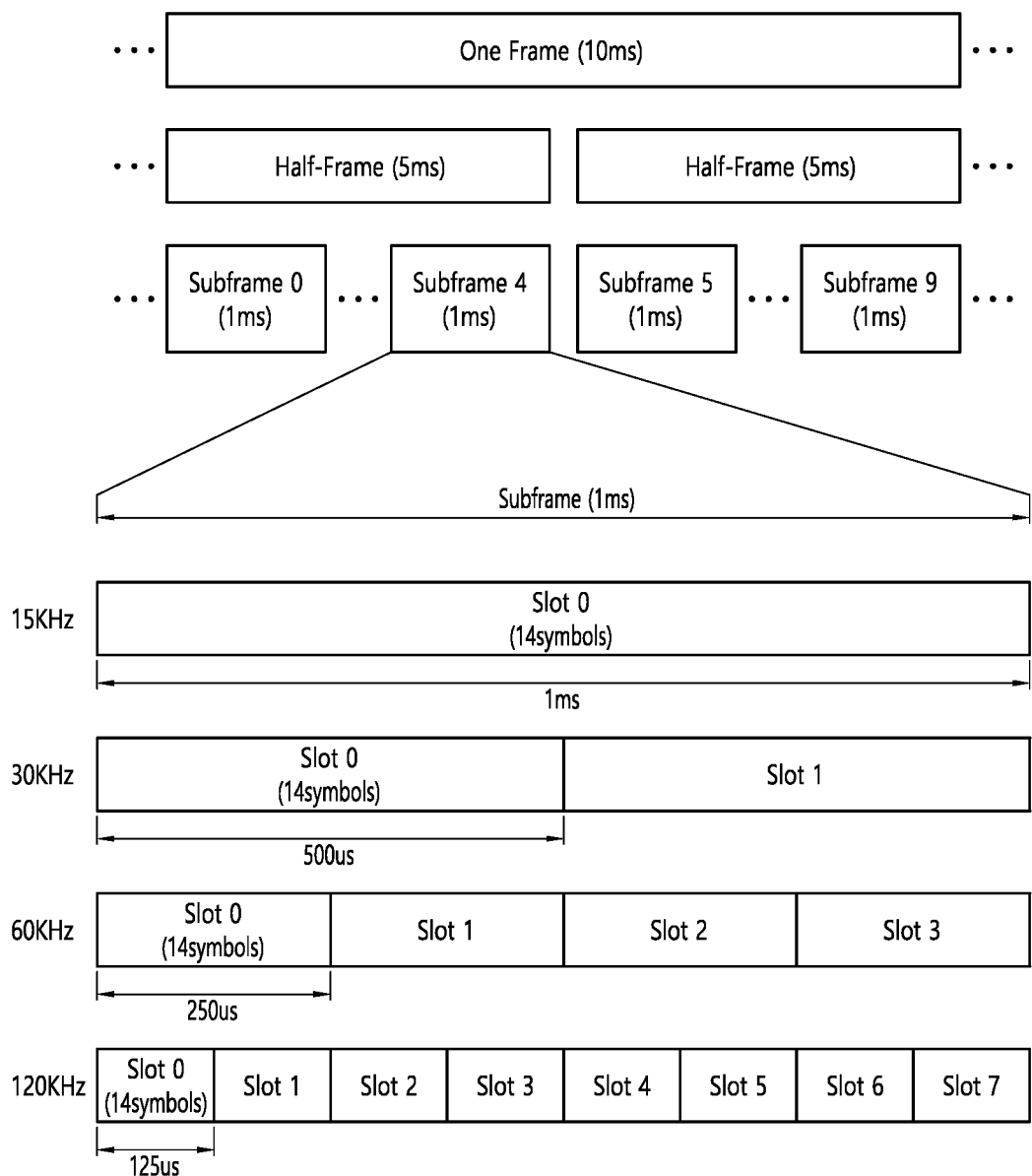
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has $T_f$=10 ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f = 2^u * 15$ kHz.

Table 1 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f = 2^u * 15$ kHz.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f = 2^u * 15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x} * N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g., RRC signaling) where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain.

In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB} = n_{CRB} + N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6

GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 9:
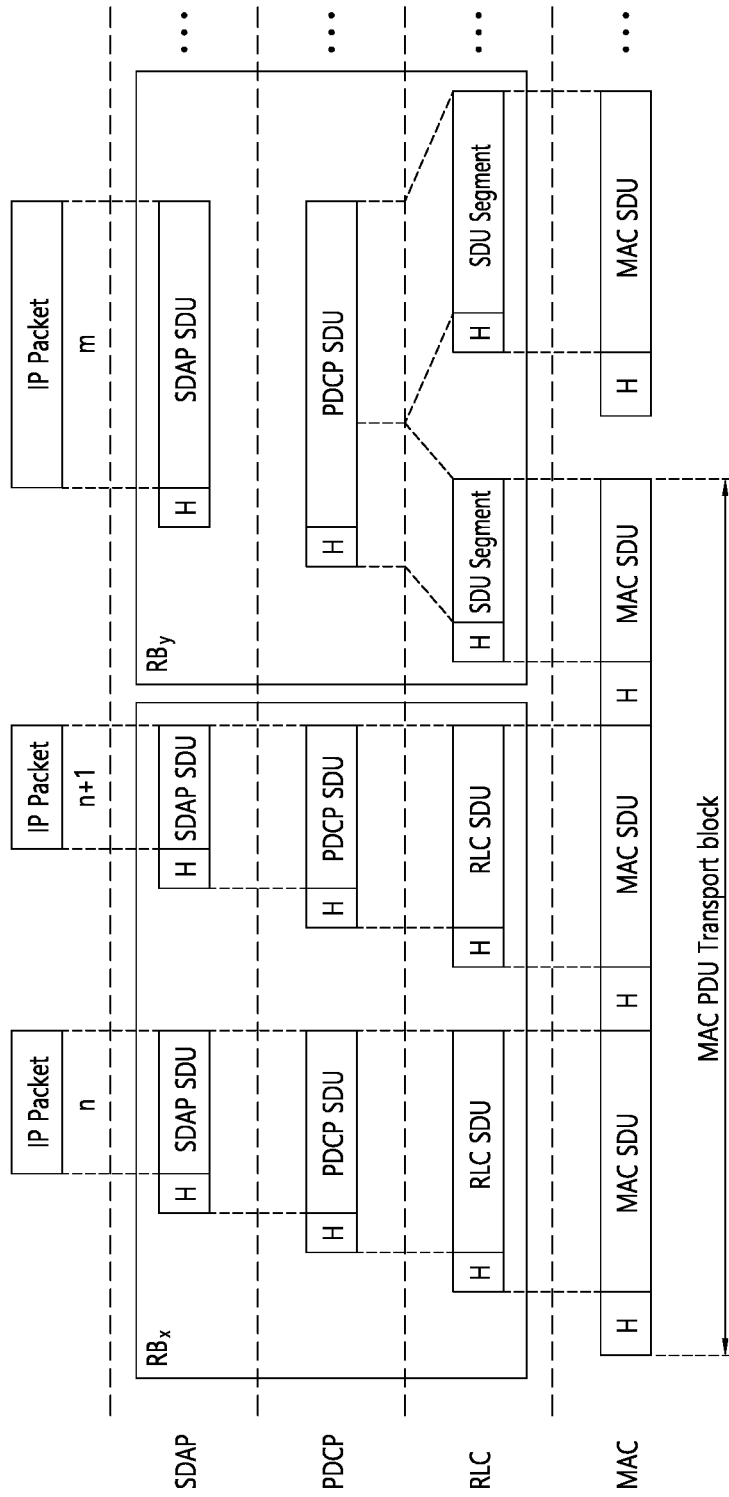
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Hereinafter, cell selection process and cell reselection evaluation process are described.

NR QoE takes LTE QoE solution as baseline, where LTE QoE solution includes the following key parts:

Both signalling based and management based initiated cases are allowed.

The LTE QoE feature is activated by Trace Function.

Application layer measurement configuration received from OAM or CN can be encapsulated in a transparent container, which is forwarded to UE in a downlink RRC message. Application layer measurements received from UE's higher layer can be encapsulated in a transparent container and sent to network in an uplink RRC message.

5G services, QoE metrics and UE KPI information are described.

NR QoE supports the Application Layer Measurement Collection functionality.

This functionality enables the collection of application layer measurements from the UE. The supported service types include:

Streaming services;

MTSI services;

VR;

MBMS;

XR.

Support for additional service types is not precluded.

In addition to the QoE metrics, the radio related measurements and information to assist the NR QoE management functionality are considered.

Application layer measurement reporting is described. Section 5.6.19 of 3GPP TS 36.331 v16.3.0 may be referred.

The purpose of this procedure is to inform E-UTRAN about application layer measurement report.

A UE capable of application layer measurement reporting in RRC_CONNECTED may initiate the procedure when configured with application layer measurement, i.e., when measConfigAppLayer has been configured by E-UTRAN.

Upon initiating the procedure, the UE shall:
1> if configured with application layer measurement, and SRB4 is configured, and the UE has received application layer measurement report information from upper layers:
2> set the measReportAppLayerContainer in the MeasReportAppLayer message to the value of the application layer measurement report information;
2> set the serviceType in the MeasReportAppLayer message to the type of the application layer measurement report information;
2> submit the MeasReportAppLayer message to lower layers for transmission via SRB4.

Information elements related to QoE reporting are described. Section 6.3.6 of 3GPP TS 36.331 v16.3.0 may be referred.

The IE OtherConfig contains configuration related to other configuration.

Table 5 shows a part of OtherConfig information element.

TABLE 5

```
-- ASN1START
OtherConfig-r9 ::= SEQUENCE{
    reportProximityConfig-r9              ReportProximityConfig-r9         OPTIONAL,    -- Need ON
    ...,
    [[  idc-Config-r11                    IDC-Config-r11                   OPTIONAL,    -- Need ON
        powerPrefIndicationConfig-r11     PowerPrefIndicationConfig-r11    OPTIONAL,    -- Need ON
        obtainLocationConfig-r11          ObtainLocationConfig-r11         OPTIONAL     -- Need ON
    ]],
    [[  low-PreferenceIndicationTimer-r14         ENUMERATED {s0, s0dot5, s1, s2, s5, s10, s20
                                                  s30, s60, s90, s120, s300, s600, spare3,
                                                  spare2, spare1}                OPTIONAL,    -- Need OR
        spe-AssistanceInfoReport-r14              BOOLEAN                        OPTIONAL,    -- Need ON
        delayBudgetReportingConfig-r14            CHOICE{
            release                               NULL,
            setup                                 SEQUENCE{
                delayBudgetReportingProhibitTimer-r14      ENUMERATED {
                                                              s0, s0dot4, s0dot5
                                                              s1dot6, s3, s6, s12, s30}
            }                                                                    OPTIONAL,    -- Need ON
        }
        rlm-ReportConfig-r14                      CHOICE {
            release                               NULL,
            setup                                 SEQUENCE{
                rlmReportTimer-r14                        ENUMERATED {s0, s0dot5, s1, s2, s5, s10, s20, s30,
                                                          s60, s90, s120, s300, s600, spare3, spare2, spare1},
                rlmReportRep-MPDCCH-r14                   ENUMERATED {setup}     OPTIONAL     -- Need OR
            }
        } OPTIONAL      -- Need ON
    ]],
    [[  overheatingAssistanceConfig-r14           CHOICE{
            release                               NULL,
            setup                                 SEQUENCE{
                overheatingIndicationProhibitTimer-r14    EMUMERATED {s0, s0dot5, s1, s2, s5, s10,
                                                              s20, s30, s60, s90, s120, s300, s600,
                                                              spare3, spare2, spare1}
            }
        } OPTIONAL      -- Need ON
    ]],
    [[  measConfigAppLayer-r15                    CHOICE{
            release                               NULL,
            setup                                 SEQUENCE{
                measConfigAppLayerContainer-r15           OCTET STRING (SIZE(1..1000)),
                serviceType-r15                           ENUMERATED {qoe, qoemtsi, spare6, spare5, spare4, spare3, spare2,
                spare1}
            }
        } OPTIONAL,     -- Need ON
        ailc-BitConfig-r15                        BOOLEAN                        OPTIONAL,    -- Need ON
        bt-NameListConfig-r15                     BT-NameListConfig-r15          OPTIONAL,    -- Need ON
        wlan-NameListConfig-r15                   WLAN-NameListConfig-r15        OPTIONAL     --Need ON
    ]],
    [[  overheatingAssistanceConfigForSCG-r18     BOOLEAN                        OPTIONAL     -- Cond overheating
    ]]
}
```

MeasReportAppLayer message related to QoE reporting are described. Section 6.2.2 of 3GPP TS 36.331 v16.3.0 may be referred.

The MeasReportAppLayer message is used for sending application layer measurement report.

Signalling radio bearer: SRB4
RLC-SAP: AM
Logical channel: DCCH
Direction: UE to E-UTRAN Table 6 shows detailed elements of MeasReportAppLayer message

TABLE 6

```
-- ASN1START
MeasReportAppLayer-r15 ::=       SEQUENCE {
    criticalExtensions               CHOICE {
        measReportAppLayer-r15         MeasReportAppLayer-r15-IEs,
        criticalExtensionsFuture       SEQUENCE { }
    }
}
MeasReportAppLayer-r15-IEs ::=   SEQUENCE {
    measReportAppLayerContainer-r15  OCTET STRING (SIZE(1..8000))              OPTIONAL,
    serviceType-r15                  ENUMERATED {qoe, qoemtsi, spare6, spare5, spare4, spare3, spare2, spare1}
        OPTIONAL,
    nonCriticalExtension             MeasReportAppLayer-v1590-IEs              OPTIONAL
}
MeasReportAppLayer-v1590-IEs ::= SEQUENCE {
    lateNonCriticalExtension         OCTET STRING                              OPTIONAL,
    nonCriticalExtension             SEQUENCE { }                              OPTIONAL
}
-- ASN1STOP
```

Table 7 shows MeasReportAppLayer field descriptions

TABLE 7

MeasReportAppLayer field descriptions measReportAppLayerContainer
The field contains container of application layer measurements.
serviceType
Indicates the type of application layer measurement. Value qoe indicates Quality of Experience Measurement Collection for streaming services, value qoemtsi indicates Quality of Experience Measurement Collection for MTSI.

Meanwhile, in UTRAN and E-UTRAN, QoE Measurement Collection for streaming services have been specified. NR is designed for different kinds of services and scenarios, and operators have strong demand to optimize their network and provide better user experiences with various types of services.

QoE management in 5G will not just collect the experience parameters of streaming services but also consider the typical performance requirements of diverse services (e.g., AR/VR and URLLC). Based on requirements of services, in RN, more adaptive QoE management schemes that enable network intelligent optimization to satisfy user experience for diverse services are suggested.

5G network will provide service for various kinds of vertical industries and various kinds of users, the 5QI service requirements may not enough to provide good user experience for all the user requirements. Thus in the 5G network, RAN also needs to collect the user KPI information, e.g., E2E reliability statistic indicator, etc.

Different types of UEs have different QoE requirements, resource allocation should be based on the UE's requirements. QoE parameters can be defined as UE-specific and service related. In addition, QoE can be used as a criteria to evaluate network quality. In the past, it was normally used the metrics such as throughput, capacity and coverage for performance evaluations for network solutions. By using QoE parameters, solutions could be evaluated in different aspects and more related to user and service experience.

During NR QoE SI phase, it needs to study the generic mechanisms of trigger, configuration and reporting for QoE measurement collection, including all relevant entities (e.g., UE, network entities). In addition, the mechanisms need to support 5G existing services as well as scalable support for new emerging services in the future.

As described above, in NR, QoE measurement may be supported. QoE measurement is an application layer measurement configured by Operations, Administration and Maintenance (OAM). QoE report is the result of a QoE measurement.

The QoE reporting has lower priority than other uplink signalling. However, the QoE reporting can be triggered very frequently, since UE can be configured with multiple QoE measurements. Considering that each QoE result can be up to 8000 bits, the QoE reporting needs to be suspended when the overload happens in RAN. If so, the QoE consumer cannot acquire the QoE results measured while the QoE reporting is suspended.

Therefore, studies for QoE reporting in a wireless communication system are required.

Hereinafter, a method for relaxed measurements in a wireless communication system, according to some embodiments of the present disclosure, will be described with reference to the following drawings.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings. Herein, a wireless device may be referred to as a user equipment (UE).

Figure 10:
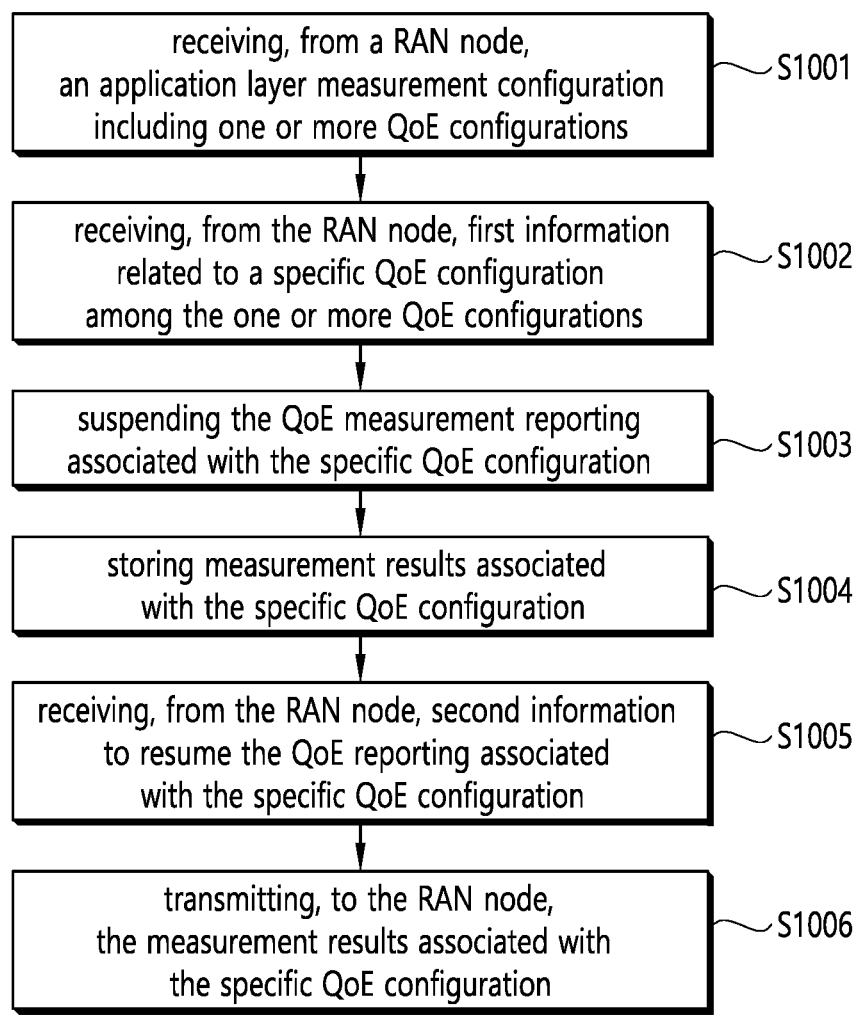
FIG. 10 shows an example of a method for handling QoE reporting associated with QoE configuration in a wireless communication system, according to some embodiments of the present disclosure.

FIG. 10 shows an example of a method for handling QoE reporting associated with QoE configuration in a wireless communication system, according to some embodiments of the present disclosure.

In step S1001, a wireless device may receive, from a radio access network (RAN) node, an application layer measurement configuration including one or more Quality of Experience (QoE) configurations.

In step S1002, a wireless device may receive, from the RAN node, first information related to a specific QoE configuration among the one or more QoE configurations.

The first information may inform to suspend QoE reporting associated with the specific QoE configuration.

For example, the first information may include information on a reporting pause indicator related to the specific QoE configuration. The reporting pause indicator may inform to store the measurement results associated with the specific QoE configuration.

For example, the first information may inform that a reporting pause indicator is set to true.

For example, the first information may be included in the application layer measurement configuration. For other example, the first information may be included in a radio resource control (RRC) release message.

In step S1003, a wireless device may suspend the QoE measurement reporting associated with the specific QoE configuration.

In step S1004, a wireless device may store measurement results associated with the specific QoE configuration.

For example, the wireless device may store time information at which the measurement results associated with the specific QoE configuration is acquired.

For example, the wireless device may store Radio Resource Management (RRM) measurements results upon acquiring the measurement results for the specific QoE configuration.

For example, an RRC layer of the wireless device may log the measurement results associated with the specific QoE configuration, acquired from one or more application layers, N-times. The wireless device may stop the logging after logging N-times.

In step S1005, a wireless device may receive, from the RAN node, second information to resume the QoE reporting associated with the specific QoE configuration.

For example, the second information may inform that a reporting pause indicator is set to false.

The wireless device may resume the QoE reporting upon receiving the second information.

In step S1006, a wireless device may transmit, to the RAN node, the measurement results associated with the specific QoE configuration.

According to some embodiments of the present disclosure, the wireless device may be in communication with at least one of a user equipment, a network, or an autonomous vehicle other than the wireless device.

Hereinafter, technical features related to an application layer configuration, according to some embodiments of the present disclosure, are described.

The UE shall:
1> if measConfigAppLayerToAddModList is included in appLayerMeasConfig within RRCReconfiguration:
2> for each measConfigAppLayerId value included in the measConfigAppLayerToAddModList:
3> if measConfigAppLayerContainer is included for the corresponding MeasConfigAppLayer configuration:
4> forward the measConfigAppLayerContainer and the measConfigAppLayerId to upper layers considering the service Type;
3> consider itself to be configured to send application layer measurement report for the measConfigAppLayerId;
3> if pauseReporting is indicated (for example, if pauseReporting is set to true):
4> if at least one segment, but not all segments, of a segmented MeasReportAppLayer (that is, MeasurementReportAppLayer) message containing an application layer measurement report associated with the measConfigAppLayerId has been submitted to lower layers for transmission:
5> submit the remaining segments of the MeasReportAppLayer message to lower layers for transmission;
4> suspend submitting application layer measurement reports to lower layers for the application layer measurement configuration associated with the measConfigAppLayerId;
4> store any previously or subsequently received application layer measurement reports associated with the measConfigAppLayerId for which no segment, or full message, has been submitted to lower layers for transmission;
3> else if pauseReporting is not indicated (for example, pauseReporting is set to false) and if application layer measurement reporting has previously been suspended for the application layer measurement configuration associated with the measConfigAppLayerId:
4> resume submitting application layer measurement reports to lower layers for the application layer measurement configuration associated with the measConfigAppLayerId (for example, submitting the reports that it has stored to lower layers for transmission)

The UE is capable of storing application layer measurement reports of an accumulated size of at least 64 kiloBytes. The UE may discard reports when the memory reserved for storing application layer measurement reports becomes full.

1> if measConfigAppLayerToReleaseList i included in appLayerMeasConfig within RRCReconfiguration:
2> for each measConfigAppLayerId value included in the measConfigAppLayerToReleaseList:
4> inform upper layers about the release of the application layer measurement configuration;
4> discard received application layer measurement report information from upper layers;
4> consider itself not to be configured to send application layer measurement report for the measConfigAppLayerId.

Tables 8 and 9 show an example of application layer measurement configuration.

The IE AppLayerMeasConfig indicates configuration of application layer measurements.

TABLE 8

AppLayerMeasConfig information element

```
-- ASN1START
-- TAG-APPLAYERMEASCONFIG -START
AppLayerMeasConfig-r17 ::=            SEQUENCE {
    measConfigAppLayerToAddModList-r17              SEQUENCE (SIZE (1..maxNrofQoE-
r17)) OF MeasConfigAppLayer-r17       OPTIONAL, -- Need N
    measConfigAppLayerToReleaseList-r17             SEQUENCE (SIZE (1..maxNrofQoE-
```

TABLE 8-continued

| AppLayerMeasConfig information element | |
|---|---|
| r17)) of MeasConfigAppLayerId-r17 | OPTIONAL, -- Need N |
| rrc-SegAllowed-r17 | ENUMERATED {enabled} |
| | OPTIONAL, -- Need M |
| ... | |
| } | |
| MeasConfigAppLayer-r17 ::= | SEQUENCE { |
| measConfigAppLayerId-r17 | MeasConfigAppLayerId-r17, |
| | OPTIONAL, - Need M |
| measConfigAppLayerContainer-r17 | OCTET STRING (SIZE (1..8000)) |
| | OPTIONAL, -- Need S |
| serviceType-r17 | ENUMERATED {streaming, mtsi, vr, spare5, |
| spare4, spare3, spara2, spare1} | OPTIONAL, -- Need S |
| pauseReporting | BOOLEAN, |
| ... | |
| } | |
| -- TAG-APPLAYERMEASCONFIG-STOP | |
| -- ASN1STOP | |

TABLE 9

| AppLayerMeasConfig field descriptions |
|---|
| measConfigAppLayerContainer |
| The field contains configuration of application layer measurements. |
| rrc-SegAllowed |
| This field, when received in MeasConfigAppLayerList, indicates that RRC segmentation of measurementReporAppLayer is allowed. |
| serviceType |
| Indicates the type of application layer measurement. Value streaming indicates Quality of Experience |
| Measurement Collection for streaming services, value mtsi indicates Quality of Experience |
| Measurement Collection for MTSI. value vr indicates Quality of Experience Measurement Collection for VR service. |

Figure 11:
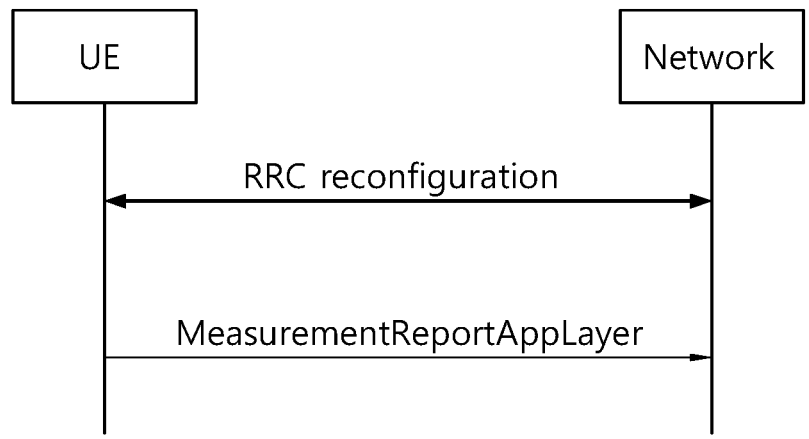
FIG. 11 shows an example of a method for application layer measurement reporting in a wireless communication system, according to some embodiments of the present disclosure.

FIG. 11 shows an example of a method for application layer measurement reporting in a wireless communication system, according to some embodiments of the present disclosure.

In this procedure, application layer measurement reports may be transmitted to the network.

A UE capable of application layer measurement reporting in RRC_CONNECTED may initiate the procedure when configured with application layer measurement, i.e. when measConfigAppLayerList (or, appLayerMeasConfig) has been configured by the network.

Upon initiating the procedure, the UE shall:
1> if configured with application layer measurement, and SRB4 is configured, and the UE AS has received, but not sent, application layer measurement report from upper layers:
1> if the application layer measurement reporting has not been paused (or suspended) for the measConfigAppLayerId associated with the application layer measurement report (for example, measConfigAppLayerID corresponds to a specific QoE configuration included in the application layer measurement configuration):
2> for each measConfigAppLayerId:
3> set the measurementReportAppLayerContainer in the MeasurementReportAppLayer message to the value of the application layer measurement report;
3> set the measConfigAppLayerId in the MeasurementReportAppLayer message to the value of the measConfigAppLayerId received together with application layer measurement report;
2> if the RRC message segmentation is enabled based on the field rrc-SegAllowed received in MeasConfigAppLayerList, and the encoded RRC message is larger than the maximum supported size of a PDCP SDU:
3> initiate the UL message segment transfer procedure;
2> else:
3> submit the MeasurementReportAppLayer message to lower layers for transmission upon which the procedure ends.

Figure 12:
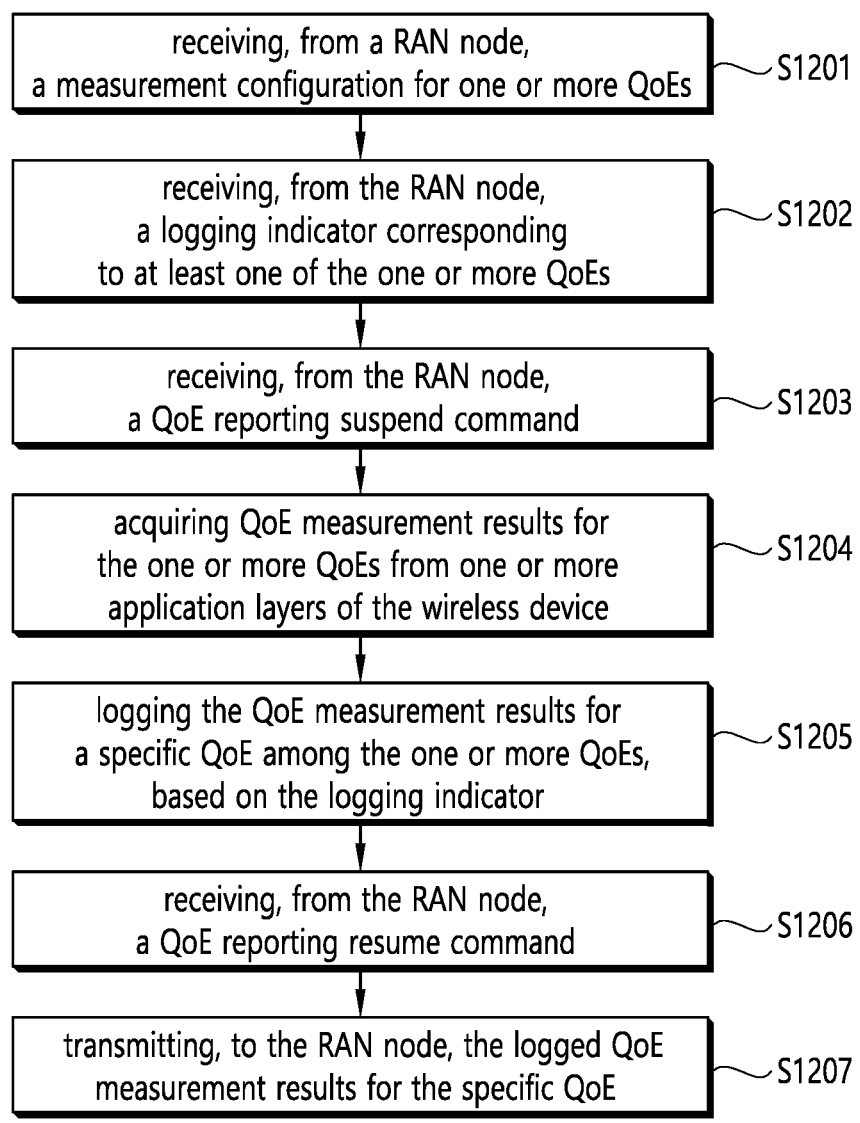
FIG. 12 shows an example of a method for QoE reporting in a wireless communication system, according to some embodiments of the present disclosure.

FIG. 12 shows an example of a method for QoE reporting in a wireless communication system, according to some embodiments of the present disclosure.

In particular, FIG. 12 shows an example of a method performed by a wireless device.

In step S1201, a wireless device may receive, from a radio access network (RAN) node, a measurement configuration for one or more Quality of Experiences (QoEs).

For example, the measurement configuration for one or more QoEs may be transmitted to one or more application layers of the wireless device. For example, a radio resource control (RRC) layer of the wireless device may transmit (or forward) the measurement configuration to the one or more application layers of the wireless device.

For example, the wireless device may receive, from the RAN node (or a network) measurement configuration for a radio resource management (RRM) measurement.

For example, the wireless device may receive (1) the measurement configuration for one or more QoEs and (2) the measurement configuration for the RRM measurement via a same message.

In step S1202, the wireless device may receive, from the RAN node, a logging indicator corresponding to at least one of the one or more QoEs. The logging indicator may inform whether to log QoE measurements results for the at least one of the one or more QoEs while QoE reporting is suspended.

For example, the wireless device may receive multiple logging indicators corresponding to each of multiple QoEs. That is, each of the multiple logging indicators may correspond to each of the multiple QoEs. In this case, each of the multiple logging indicators may inform whether to log QoE measurement results for the corresponding QoE among the multiple QoEs.

For other example, a single logging indicator may correspond to multiple QoEs. The single logging indicator may inform whether to log QoE measurement results for each of the multiple QoEs, respectively. For example, a specific logging indicator may correspond to a first QoE and a second QoE. The specific logging indicator may inform that (1) logging QoE measurement results for the first QoE is required and (2) logging QoE measurement results for the second QoE is not required.

Otherwise, the single logging indicator may inform whether to log QoE measurement results for all of the multiple QoEs. For example, a specific logging indicator may correspond to a first QoE and a second QoE. The specific logging indicator may inform whether logging QoE measurement results for the first QoE and the second QoE is required or not.

For example, the wireless device may receive a first logging indicator, a second logging indicator, and other logging indicators. The first logging indicator may inform whether to log QoE measurement results for a single QoE. The second logging indicator may inform whether to log QoE measurement results for multiple QoEs.

For example, the logging indicator may be configured per service type of QoE, per measurement configuration for QoE, or per QoE.

That is, for example, a single logging indicator may inform whether to log the QoE measurement results for (1) QoEs related to a specific service type (for example, AR/VR, URLLC, MBS, Streaming services, MTSI services, VR, MBMS, XR), (2) QoEs related to a certain measurement configuration, or (3) a certain QoE.

For example, the logging indicator may be included in the measurement configuration for the one or more QoEs which is received in step S1201. For other example, the wireless device may receive the logging indicator separately from the measurement configuration.

For example, the logging indicator may be included in a radio resource control (RRC) release message.

In step S1203, the wireless device may receive, from the RAN node, a QoE reporting suspend command.

For example, the QoE reporting suspend command may be configured per QoE measurement, per group of QoE measurements, or for all configured QoE measurements.

That is, when the wireless device receive the QoE reporting suspend command, the wireless device may suspend QoE reporting for (1) a certain QoE, (2) a group of QoEs, or (3) all of the QoEs. In other words, a wireless device may suspend the QoE reporting for a certain QoE while performing the QoE reporting for other QoEs.

The following steps S1204 and S1205 may be performed while the QoE reporting is suspended.

In step S1205, while the QoE reporting is suspended, a wireless device may acquire QoE measurement results for the one or more QoEs from one or more application layers of the wireless device.

For example, the one or more application layers of the wireless device may perform QoE measurement based on the measurement configuration received form step S1201.

In step S1205, while the QoE reporting is suspended, a wireless device may log the QoE measurement results for a specific QoE among the one or more QoEs, based on that the logging indicator informs to log the QoE measurement results for the specific QoE.

For example, the RRC layer of the wireless device may log the QoE measurement results for the specific QoE among the one or more QoEs when the logging indicator informs to log the QoE measurement results for the specific QoE.

For example, the wireless device may log time information at which the QoE measurement results for the at least one QoE is acquired. For example, the time information may be acquired from the one or more application layers or the RRC layer.

For example, the wireless device may log RRM measurements results upon acquiring the QoE measurement results for the at least one QoE. The RRM measurement results may be acquired from the RRC layer by performing the RRM measurement.

For example, the RRM measurement may be performed by the RRC layer, upon acquiring the QoE measurement results. Otherwise, the RRC layer may log the RRM measurement results performed at the time (or immediately following time) at which the QoE measurement results were obtained.

For example, the RRC layer of the wireless device may log the QoE measurement results for the specific QoE, acquired from the one or more application layers, N-times. The RRC layer may stop the logging after logging N-times. That is, the RRC layer may discard the rest of the acquired QoE measurement results while the QoE reporting is suspended. In this case, the logged QoE measurement results for the specific QoE may include the QoE measurement results for the specific QoE logged N-times.

In step S1206, a wireless device may receive, from the RAN node, a QoE reporting resume command.

For example, the QoE reporting resume command may be configured per QoE measurement, per group of QoE measurements, or for all configured QoE measurements.

That is, when the wireless device receive the QoE reporting resume command, the wireless device may resume QoE reporting for (1) a certain QoE, (2) a group of QoEs, or (3) all of the QoEs. In other words, a wireless device may resume the QoE reporting for a certain QoE while suspending the QoE reporting for other QoEs.

In step S1207, a wireless device may transmit, to the RAN node, the logged QoE measurement results for the specific QoE.

For example, the wireless device may transmit, to the RAN node, a message including (1) the logged QoE measurement results, (2) logged time information related to the logged QoE measurement results, and/or (3) logged RRM measurement results related to the logged QoE measurement results.

According to some embodiments of the present disclosure, the wireless device may suspend the QoE reporting upon receiving the QoE reporting suspend command. The wireless device may resume the QoE reporting upon receiving the QoE reporting resume command.

According to some embodiments of the present disclosure, the wireless device may suspend the QoE reporting upon entering RRC_IDLE or RRC_INACTIVE. The wireless device may resume the QoE reporting upon entering RRC_CONNECTED. In this case, for example, the logging indicator may be included in an RRC release message.

According to some embodiments of the present disclosure, the wireless device may be in communication with at least one of a user equipment, a network, or an autonomous vehicle other than the wireless device.

Hereinafter, a method for suspension of measurement reporting, according to some embodiments of the present disclosure, is described.

According to some embodiments of the present disclosure, UE may log the measurement results while the measurement reporting is suspended. When the measurement reporting is resumed, the UE may transmit the logged measurement results to the network. The measurement may be performance measurement, for example, QoE measurement, or radio quality related measurement, for example, Radio resource management (RRM) measurements.

The measurement configuration (for example, configuration for application layer measurements or RRM measurements) may include an indication which indicates whether to log the measurement results while the measurement reporting is suspended. The indication may be configured per service type, per QoE configuration, per measurement object, or per UE.

For a measurement for which the logging is configured (for example, the logging indicator is set to TRUE), the UE may keep performing the measurement, while the measurement reporting is suspend.

For a measurement for which the logging is not configured (for example, the logging indicator is set to FALSE), the UE may suspend the corresponding measurement, while the measurement reporting is suspend. For suspended measurements, the UE may resume the measurements, when the measurement reporting is resumed.

For a measurement for which the logging is not configured, the UE may discard the measurement results measured while the measurement reporting is suspend.

For example, while the measurement is configured but not suspended, the UE may transmit the measurement results to the network as soon as the measurement report triggering condition is met (for example, QoE results is delivered to RRC layer from application layer).

For example, while the measurement reporting is suspended, UE may perform the logging of the measurement results up to N-times. For instance, if the UE is configured to perform the logging N-times, the UE may stop the logging after logging N-times, though the QoE reporting is still suspended. When the QoE is resumed, the UE may transmit the N-logged QoE results to the network.

For example, UE may consider that the configured QoE is suspended when QoE suspend command is received from network. UE may consider that the configured QoE is suspended, when RRCRelease message including suspendConfig is received from network. Otherwise, UE may consider that the configured QoE is suspended, when RRCRelease message not including suspendConfig is received from network.

For example, UE may consider that the configured QoE is suspended when entering RRC_IDLE or RRC_INACTIVE.

For example, UE may consider that the configured QoE is resumed when QoE resume command is received from network. For example, UE may consider that the configured QoE is resumed, when RRC connection establishment or RRC connection resume is successfully completed. For example, UE may consider that the configured QoE is resumed, when entering RRC_CONNECTED.

For example, UE may inform the network of whether the UE has the logged QoE measurement results or not during RRC connection establishment or RRC connection resume procedure.

The QoE suspend/resume may be commanded per QoE measurement, per group of QoE measurements, or for all configured QoE measurements.

For example, when UE logs the QoE measurement results, the UE may also log the time stamp, location information, and/or RRM measurement results that are available in RRC when the QoE measurement results are received from application layer.

The time stamp may be the time when the QoE is measured. For example, the time stamp is provided from application layer to RRC layer along with the QoE measurement results. For example, the time stamp may be the time when the RRC layer receives the QoE measurement results from application layer.

According to some embodiments of the present disclosure, a UE may receive a measurement configuration including an indicator. The indicator may indicate whether to log the measurement results while the measurement reporting is suspended. The UE may receive a command to suspend the measurement reporting from network. The UE may acquire measurement results. If the measurement is configured to be logged, the UE may log the measurement results. The UE may receive a command to resume the measurement reporting from network. The UE may transmit the logged measurement results to network.

According to some embodiments of the present disclosure, a UE may receive a QoE configuration including an indicator indicating whether to log the QoE measurement results while the QoE reporting is suspended. The UE may receive a command to suspend the QoE reporting from network. The UE may acquire QoE measurement results. If the QoE reporting is configured to be logged, the UE may log the QoE measurement results. The UE may receive a command to resume the QoE reporting from network. The UE may transmit the logged QoE measurement results to network.

Figure 13:
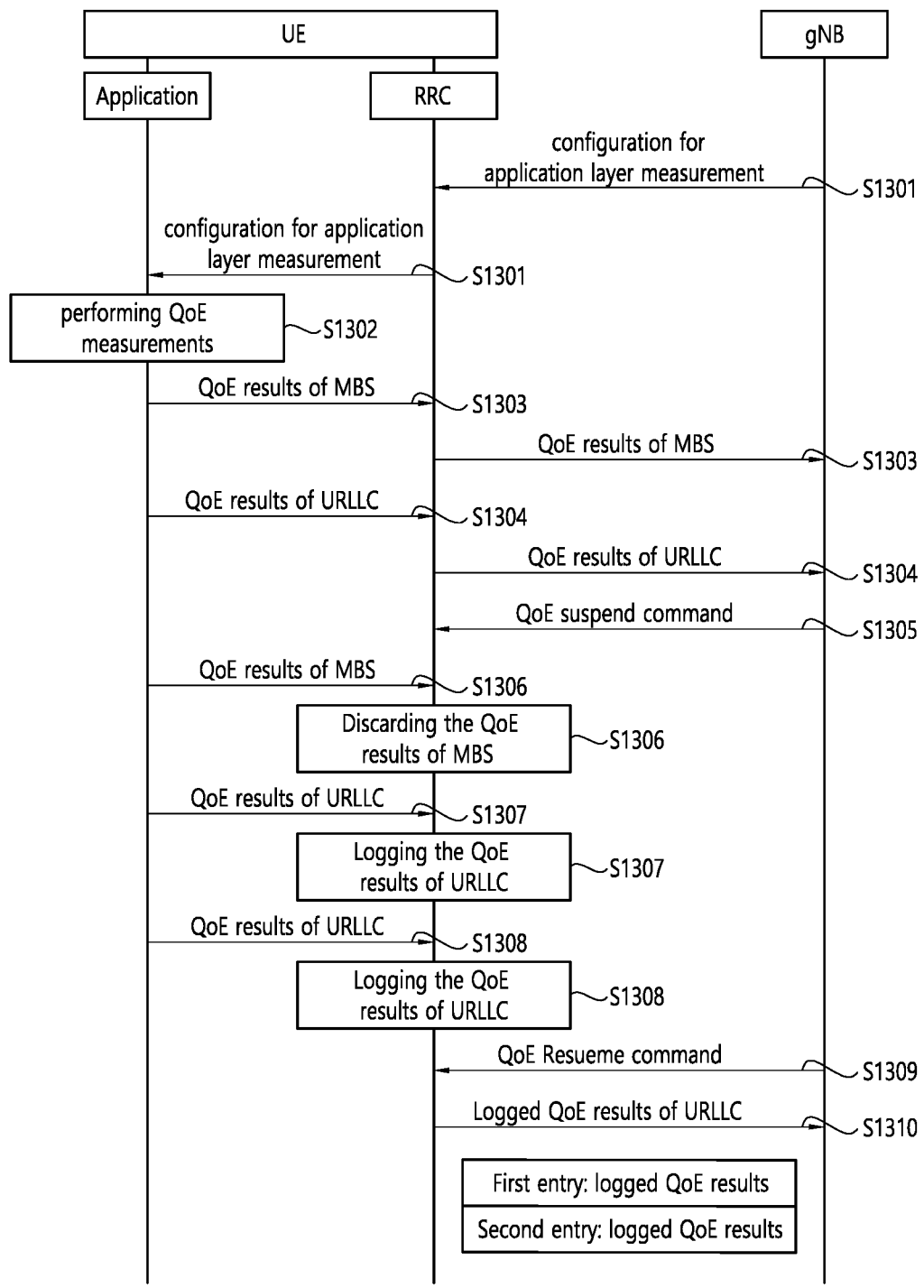
FIG. 13 shows an example of UE operations according to some embodiment of the present disclosure.

FIG. 13 shows an example of UE operations according to some embodiment of the present disclosure.

In step S1301, UE may receive a configuration for application layer measurements from gNB. The configuration may include two QoE measurements, one for MBS service and another for URLLC service. The logging indicator may be set to TRUE and FALSE for the URLLC service and the MBS service, respectively.

In step S1302, application layer in the UE may perform the QoE measurements according to the received configuration.

In step S1303, the QoE measurement result for MBS may be delivered to RRC layer from application layer. The UE may transmit the QoE measurement result of MBS to the gNB.

In step S1304, the QoE measurement result for URLLC may be delivered to RRC layer from application layer. The UE may transmit the QoE measurement result of URLLC to the gNB.

In step S1305, UE may receive the QoE suspend command for all configured QoE measurements from the gNB.

In step S1306, the QoE measurement result for MBS may be delivered to RRC layer from application layer. The UE may discard the QoE measurement result of MBS.

In step S1307, the QoE measurement result for URLLC may be delivered to RRC layer from application layer. The UE may log the QoE measurement result of URLLC. The UE may also log the time the QoE measurement result is delivered to RRC layer from application layer. The UE may also log the RRM measurement results of serving cell(s) and neighbour cell(s).

In step S1308, the QoE measurement result for URLLC may be delivered to RRC layer from application layer once more. The UE may log the QoE measurement result of URLLC. The UE may also log the time the QoE measurement result is delivered to RRC layer from application layer. The UE may also log the RRM measurement results of serving cell(s) and neighbour cell(s).

In step S1309, UE may receive the QoE resume command from the gNB.

In step S1310, UE may transmit the logged QoE measurement results of URLLC to the network.

Some of the detailed steps shown in the example of FIGS. 10, 11, and 12 may not be essential steps and may be omitted. In addition, steps other than the steps shown in FIGS. 10, 11, and 12 may be added, and the order of the steps may vary. Some of the above steps may have their own technical meaning.

Hereinafter, an apparatus for QoE reporting in a wireless communication system, according to some embodiments of the present disclosure, will be described. Herein, the apparatus may be a wireless device (100 or 200) in FIGS. 2, 3, and 5.

For example, a wireless device may perform methods described above. The detailed description overlapping with the above-described contents could be simplified or omitted.

Referring to FIG. 5, a wireless device 100 may include a processor 102, a memory 104, and a transceiver 106.

According to some embodiments of the present disclosure, the processor 102 may be configured to be coupled operably with the memory 104 and the transceiver 106.

The processor 102 may be configured to control the transceiver 106 to receive, from a radio access network (RAN) node, an application layer measurement configuration including one or more Quality of Experience (QoE) configuration. The processor 102 may be configured to control the transceiver 106 to receive, from the RAN node, first information related to a specific QoE configuration among the one or more QoE configurations. The first information may inform to suspend QoE reporting associated with the specific QoE configuration. The processor 102 may be configured to suspend the QoE measurement reporting associated with the specific QoE configuration. The processor 102 may be configured to store measurement results associated with the specific QoE configuration. The processor 102 may be configured to control the transceiver 106 to receive, from the RAN node, second information to resume the QoE reporting associated with the specific QoE configuration. The processor 102 may be configured to control the transceiver 106 to transmit, to the RAN node, the measurement results associated with the specific QoE configuration.

For example, the first information may include information on a reporting pause indicator related to the specific QoE configuration. The reporting pause indicator may inform to store the measurement results associated with the specific QoE configuration.

For example, the first information may inform that a reporting pause indicator is set to true.

For example, the second information may inform that a reporting pause indicator is set to false.

For example, the processor 102 may be configured to store time information at which the measurement results associated with the specific QoE configuration is acquired.

For example, the processor 102 may be configured to store Radio Resource Management (RRM) measurements results upon acquiring the measurement results for the specific QoE configuration.

For example, the first information may be included in the application layer measurement configuration.

For example, the first information may be included in a radio resource control (RRC) release message.

For example, the storing measurement results associated with the specific QoE configuration may include logging, by an RRC layer of the wireless device, the measurement results associated with the specific QoE configuration, acquired from one or more application layers, N-times, and stopping the logging after logging N-times.

For example, the processor 102 may be configured to resume the QoE reporting upon receiving the second information.

According to some embodiments of the present disclosure, the processor 102 may be configured to control the transceiver 106 to receive, from a radio access network (RAN) node, a measurement configuration for one or more Quality of Experiences (QoEs). The processor 102 may be configured to control the transceiver 106 to receive, from the RAN node, a logging indicator corresponding to at least one of the one or more QoEs. The logging indicator may inform whether to log QoE measurements results for the at least one of the one or more QoEs while QoE reporting is suspended. The processor 102 may be configured to control the transceiver 106 to receive, from the RAN node, a QoE reporting suspend command. while the QoE reporting is suspended, (1) the processor 102 may be configured to acquire QoE measurement results for the one or more QoEs from one or more application layers of the wireless device, and (2) the processor 102 may be configured to log the QoE measurement results for a specific QoE among the one or more QoEs, based on that the logging indicator informs to log the QoE measurement results for the specific QoE. The processor 102 may be configured to control the transceiver 106 to receive, from the RAN node, a QoE reporting resume command. The processor 102 may be configured to control the transceiver 106 to transmit, to the RAN node, the logged QoE measurement results for the specific QoE.

For example, the processor 102 may be configured to log time information at which the QoE measurement results for the at least one QoE is acquired.

For example, the processor 102 may be configured to log RRM measurements results upon acquiring the QoE measurement results for the at least one QoE.

For example, the logging indicator may be included in the measurement configuration for the one or more QoEs.

For example, the logging indicator may be included in a radio resource control (RRC) release message.

For example, the logging indicator may be configured per service type of QoE, per measurement configuration for QoE, or per QoE.

For example, the step of the logging the QoE measurement results for a specific QoE further comprises, (1) logging, by an RRC layer or the wireless device, the QoE measurement results for the specific QoE, acquired from the one or more application layers, N-times, and (2) stopping the logging after logging N-times. In this case, the logged QoE measurement results for the specific QoE includes the QoE measurement results for the specific QoE logged N-times.

For example, the QoE reporting suspend command may be configured per QoE measurement, per group of QoE measurements, or for all configured QoE measurements.

For example, the QoE reporting resume command may be configured per QoE measurement, per group of QoE measurements, or for all configured QoE measurements.

According to some embodiments of the present disclosure, the processor 102 may be configured to suspend the QoE reporting upon receiving the QoE reporting suspend command. The processor 102 may be configured to resume the QoE reporting upon receiving the QoE reporting resume command.

According to some embodiments of the present disclosure, the processor 102 may be configured to suspend the QoE reporting upon entering RRC_IDLE or RRC_INACTIVE. The processor 102 may be configured to resume the QoE reporting upon entering RRC_CONNECTED.

According to some embodiments of the present disclosure, the processor 102 may be configured to be in communication with at least one of a user equipment, a network, or an autonomous vehicle other than the wireless device.

Hereinafter, a processor for a wireless device for QoE reporting in a wireless communication system, according to some embodiments of the present disclosure, will be described.

The processor may be configured to control the wireless device to receive, from a radio access network (RAN) node, an application layer measurement configuration including one or more Quality of Experience (QoE) configuration. The processor may be configured to control the wireless device to receive, from the RAN node, first information related to a specific QoE configuration among the one or more QoE configurations. The first information may inform to suspend QoE reporting associated with the specific QoE configuration. The processor may be configured to control the wireless device to suspend the QoE measurement reporting associated with the specific QoE configuration. The processor may be configured to control the wireless device to store measurement results associated with the specific QoE configuration. The processor may be configured to control the wireless device to receive, from the RAN node, second information to resume the QoE reporting associated with the specific QoE configuration. The processor may be configured to control the wireless device to transmit, to the RAN node, the measurement results associated with the specific QoE configuration.

For example, the first information may include information on a reporting pause indicator related to the specific QoE configuration. The reporting pause indicator may inform to store the measurement results associated with the specific QoE configuration.

For example, the first information may inform that a reporting pause indicator is set to true.

For example, the second information may inform that a reporting pause indicator is set to false.

For example, the processor may be configured to control the wireless device to store time information at which the measurement results associated with the specific QoE configuration is acquired.

For example, the processor may be configured to control the wireless device to store Radio Resource Management (RRM) measurements results upon acquiring the measurement results for the specific QoE configuration.

For example, the first information may be included in the application layer measurement configuration.

For example, the first information may be included in a radio resource control (RRC) release message.

For example, the storing measurement results associated with the specific QoE configuration may include logging, by an RRC layer of the wireless device, the measurement results associated with the specific QoE configuration, acquired from one or more application layers, N-times, and stopping the logging after logging N-times.

For example, the processor may be configured to control the wireless device to resume the QoE reporting upon receiving the second information.

According to some embodiments of the present disclosure, the processor may be configured to control the wireless device to receive, from a radio access network (RAN) node, a measurement configuration for one or more Quality of Experiences (QoEs). The processor may be configured to control the wireless device to receive, from the RAN node, a logging indicator corresponding to at least one of the one or more QoEs. The logging indicator may inform whether to log QoE measurements results for the at least one of the one or more QoEs while QoE reporting is suspended. The processor may be configured to control the wireless device to receive, from the RAN node, a QoE reporting suspend command. while the QoE reporting is suspended, (1) the processor may be configured to control the wireless device to acquire QoE measurement results for the one or more QoEs from one or more application layers of the wireless device, and (2) the processor may be configured to control the wireless device to log the QoE measurement results for a specific QoE among the one or more QoEs, based on that the logging indicator informs to log the QoE measurement results for the specific QoE. The processor may be configured to control the wireless device to receive, from the RAN node, a QoE reporting resume command. The processor may be configured to control the wireless device to transmit, to the RAN node, the logged QoE measurement results for the specific QoE.

For example, the processor may be configured to control the wireless device to log time information at which the QoE measurement results for the at least one QoE is acquired.

For example, the processor may be configured to control the wireless device to log RRM measurements results upon acquiring the QoE measurement results for the at least one QoE.

For example, the logging indicator may be included in the measurement configuration for the one or more QoEs.

For example, the logging indicator may be included in a radio resource control (RRC) release message.

For example, the logging indicator may be configured per service type of QoE, per measurement configuration for QoE, or per QoE.

For example, the step of the logging the QoE measurement results for a specific QoE further comprises, (1) logging, by an RRC layer or the wireless device, the QoE measurement results for the specific QoE, acquired from the one or more application layers, N-times, and (2) stopping the logging after logging N-times. In this case, the logged QoE measurement results for the specific QoE includes the QoE measurement results for the specific QoE logged N-times.

For example, the QoE reporting suspend command may be configured per QoE measurement, per group of QoE measurements, or for all configured QoE measurements.

For example, the QoE reporting resume command may be configured per QoE measurement, per group of QoE measurements, or for all configured QoE measurements.

According to some embodiments of the present disclosure, the processor may be configured to control the wireless device to suspend the QoE reporting upon receiving the QoE reporting suspend command. The processor may be configured to control the wireless device to resume the QoE reporting upon receiving the QoE reporting resume command.

According to some embodiments of the present disclosure, the processor may be configured to control the wireless device to suspend the QoE reporting upon entering RRC_IDLE or RRC_INACTIVE. The processor may be configured to control the wireless device to resume the QoE reporting upon entering RRC_CONNECTED.

According to some embodiments of the present disclosure, the processor may be configured to control the wireless device to be in communication with at least one of a user equipment, a network, or an autonomous vehicle other than the wireless device.

Hereinafter, a non-transitory computer-readable medium has stored thereon a plurality of instructions for QoE reporting in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a wireless device.

The stored a plurality of instructions may cause the wireless device to receive, from a radio access network (RAN) node, an application layer measurement configuration including one or more Quality of Experience (QoE) configuration. The stored a plurality of instructions may cause the wireless device to receive, from the RAN node, first information related to a specific QoE configuration among the one or more QoE configurations. The first information may inform to suspend QoE reporting associated with the specific QoE configuration. The stored a plurality of instructions may cause the wireless device to suspend the QoE measurement reporting associated with the specific QoE configuration. The stored a plurality of instructions may cause the wireless device to store measurement results associated with the specific QoE configuration. The stored a plurality of instructions may cause the wireless device to receive, from the RAN node, second information to resume the QoE reporting associated with the specific QoE configuration. The stored a plurality of instructions may cause the wireless device to transmit, to the RAN node, the measurement results associated with the specific QoE configuration.

For example, the first information may include information on a reporting pause indicator related to the specific QoE configuration. The reporting pause indicator may inform to store the measurement results associated with the specific QoE configuration.

For example, the first information may inform that a reporting pause indicator is set to true.

For example, the second information may inform that a reporting pause indicator is set to false.

For example, the stored a plurality of instructions may cause the wireless device to store time information at which the measurement results associated with the specific QoE configuration is acquired.

For example, the stored a plurality of instructions may cause the wireless device to store Radio Resource Management (RRM) measurements results upon acquiring the measurement results for the specific QoE configuration.

For example, the first information may be included in the application layer measurement configuration.

For example, the first information may be included in a radio resource control (RRC) release message.

For example, the storing measurement results associated with the specific QoE configuration may include logging, by an RRC layer of the wireless device, the measurement results associated with the specific QoE configuration, acquired from one or more application layers, N-times, and stopping the logging after logging N-times.

For example, the stored a plurality of instructions may cause the wireless device to resume the QoE reporting upon receiving the second information.

According to some embodiments of the present disclosure, the stored a plurality of instructions may cause the wireless device to receive, from a radio access network (RAN) node, a measurement configuration for one or more Quality of Experiences (QoEs). The stored a plurality of instructions may cause the wireless device to receive, from the RAN node, a logging indicator corresponding to at least one of the one or more QoEs. The logging indicator may inform whether to log QoE measurements results for the at least one of the one or more QoEs while QoE reporting is suspended. The stored a plurality of instructions may cause the wireless device to receive, from the RAN node, a QoE reporting suspend command. while the QoE reporting is suspended, (1) the stored a plurality of instructions may cause the wireless device to acquire QoE measurement results for the one or more QoEs from one or more application layers of the wireless device, and (2) the stored a plurality of instructions may cause the wireless device to log the QoE measurement results for a specific QoE among the one or more QoEs, based on that the logging indicator informs to log the QoE measurement results for the specific QoE. The stored a plurality of instructions may cause the wireless device to receive, from the RAN node, a QoE reporting resume command. The stored a plurality of instructions may cause the wireless device to transmit, to the RAN node, the logged QoE measurement results for the specific QoE.

For example, the stored a plurality of instructions may cause the wireless device to log time information at which the QoE measurement results for the at least one QoE is acquired.

For example, the stored a plurality of instructions may cause the wireless device to log RRM measurements results upon acquiring the QoE measurement results for the at least one QoE.

For example, the logging indicator may be included in the measurement configuration for the one or more QoEs.

For example, the logging indicator may be included in a radio resource control (RRC) release message.

For example, the logging indicator may be configured per service type of QoE, per measurement configuration for QoE, or per QoE.

For example, the step of the logging the QoE measurement results for a specific QoE further comprises, (1) logging, by an RRC layer or the wireless device, the QoE measurement results for the specific QoE, acquired from the one or more application layers, N-times, and (2) stopping the logging after logging N-times. In this case, the logged QoE measurement results for the specific QoE includes the QoE measurement results for the specific QoE logged N-times.

For example, the QoE reporting suspend command may be configured per QoE measurement, per group of QoE measurements, or for all configured QoE measurements.

For example, the QoE reporting resume command may be configured per QoE measurement, per group of QoE measurements, or for all configured QoE measurements.

According to some embodiments of the present disclosure, the stored a plurality of instructions may cause the wireless device to suspend the QoE reporting upon receiving the QoE reporting suspend command. The stored a plurality of instructions may cause the wireless device to resume the QoE reporting upon receiving the QoE reporting resume command.

According to some embodiments of the present disclosure, the stored a plurality of instructions may cause the wireless device to suspend the QoE reporting upon entering RRC_IDLE or RRC_INACTIVE. The stored a plurality of instructions may cause the wireless device to resume the QoE reporting upon entering RRC_CONNECTED.

According to some embodiments of the present disclosure, the stored a plurality of instructions may cause the wireless device to be in communication with at least one of a user equipment, a network, or an autonomous vehicle other than the wireless device.

Hereinafter, a method performed by a base station (BS) for QoE reporting in a wireless communication system, according to some embodiments of the present disclosure, will be described.

The BS may transmit, to a wireless device, an application layer measurement configuration including one or more Quality of Experience (QoE) configurations. The BS may transmit, to the wireless device, first information related to a specific QoE configuration among the one or more QoE configurations. The first information may inform to suspend QoE reporting associated with the specific QoE configuration. The BS may transmit, to the wireless device, second information to resume the QoE reporting associated with the specific QoE configuration. The BS may receive, from the wireless device, the measurement results associated with the specific QoE configuration.

The BS may transmit, to a wireless device, a measurement configuration for one or more Quality of Experiences (QoEs). The BS may transmit, to the wireless device, a logging indicator corresponding to at least one of the one or more QoEs. The logging indicator may inform whether to log QoE measurements results for the at least one of the one or more QoEs while QoE reporting is suspended. The BS may transmit, to the wireless device, a QoE reporting suspend command. The BS may transmit, to the wireless device, a QoE reporting resume command. The BS may receive, from the wireless device, logged QoE measurement results for the specific QoE.

Hereinafter, a base station (BS) for QoE reporting in a wireless communication system, according to some embodiments of the present disclosure, will be described.

The BS may include a transceiver, a memory, and a processor operatively coupled to the transceiver and the memory.

The processor may be configured to control the transceiver to transmit, to a wireless device, an application layer measurement configuration including one or more Quality of Experience (QoE) configurations. The processor may be configured to control the transceiver to transmit, to the wireless device, first information related to a specific QoE configuration among the one or more QoE configurations. The first information may inform to suspend QoE reporting associated with the specific QoE configuration. The processor may be configured to control the transceiver to transmit, to the wireless device, second information to resume the QoE reporting associated with the specific QoE configuration. The processor may be configured to control the transceiver to receive, from the wireless device, the measurement results associated with the specific QoE configuration.

The processor may be configured to control the transceiver to transmit, to a wireless device, a measurement configuration for one or more Quality of Experiences (QoEs). The processor may be configured to control the transceiver to transmit, to the wireless device, a logging indicator corresponding to at least one of the one or more QoEs. The logging indicator may inform whether to log QoE measurements results for the at least one of the one or more QoEs while QoE reporting is suspended. The processor may be configured to control the transceiver to transmit, to the wireless device, a QoE reporting suspend command. The processor may be configured to control the transceiver to transmit, to the wireless device, a QoE reporting resume command. The processor may be configured to control the transceiver to receive, from the wireless device, logged QoE measurement results for the specific QoE.

The present disclosure can have various advantageous effects.

According to some embodiments of the present disclosure, a wireless device could perform QoE reporting efficiently.

In particular, a wireless device could efficiently suspend the QoE reporting by logging QoE measurement results.

That is, a wireless device could log the measurement results depending on the service type or priority of the configured measurements, when overload happens in RAN.

Therefore, the network or service provider can acquire the measurement results measured during the RAN overload.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:
1. A method performed by a wireless device in a wireless communication system, the method comprising,
  receiving, from a radio access network (RAN) node, a configuration including multiple application layer measurement configurations;

receiving, from the RAN node, (i) information informing a specific application layer measurement configuration among the multiple application layer measurement configurations and (ii) a pause indicator related to the specific application layer measurement configuration,
wherein the pause indicator informs whether transmission of measurement reporting related to the specific application layer measurement configuration is paused or not;
based on the pause indicator informing that the transmission of measurement reporting related to the specific application layer measurement configuration is paused: suspending the measurement reporting related to the specific application layer measurement configuration; and storing measurement results related to the specific application layer measurement configuration; and
based on the pause indicator informing that the transmission of measurement reporting related to the specific application layer measurement configuration is not paused, performing the transmission of measurement reporting related to the specific application layer measurement configuration.

2. The method of claim 1, wherein the information informing the specific application layer measurement configuration includes an identity (ID) for the specific application layer measurement configuration.

3. The method of claim 1,
wherein the pause indicator set to true informs that the transmission of measurement reporting related to the specific application layer measurement configuration is paused, and
wherein the pause indicator set to false informs that the transmission of measurement reporting related to the specific application layer measurement configuration is not paused.

4. The method of claim 1, wherein the method further comprises:
based on the pause indicator informing that the transmission of measurement reporting related to the specific application layer measurement configuration is paused: storing time information at which the measurement results related to the specific application layer measurement configuration are acquired.

5. The method of claim 1, wherein the method further comprises:
based on the pause indicator informing that the transmission of measurement reporting related to the specific application layer measurement configuration is paused: storing Radio Resource Management (RRM) measurements results upon acquiring the measurement results for the specific application layer measurement configuration.

6. The method of claim 1,
wherein (i) the information informing the specific application layer measurement configuration among the multiple application layer measurement configurations and (ii) the pause indicator related to the specific application layer measurement configuration are included in the configuration including the multiple application layer measurement configurations,
wherein the first information is included in the application layer measurement configuration.

7. The method of claim 1, wherein (i) the information informing the specific application layer measurement configuration among the multiple application layer measurement configurations and (ii) the pause indicator related to the specific application layer measurement configuration are included in a radio resource control (RRC) release message.

8. The method of claim 1, wherein the storing measurement results related to the specific application layer measurement configuration further comprises:
logging, by an RRC layer of the wireless device, the measurement results related to the specific application layer measurement configuration, acquired from one or more application layers, N-times; and
stopping the logging after logging N-times.

9. The method of claim 1, wherein the wireless device is in communication with at least one of a user equipment, a network, or an autonomous vehicle other than the wireless device.

10. A wireless device in a wireless communication system comprising:
a transceiver;
a memory; and
at least one processor operatively coupled to the transceiver and the memory, and configured to:
receive, from a radio access network (RAN) node, a configuration including multiple application layer measurement configurations;
receive, from the RAN node, (i) information informing a specific application layer measurement configuration among the multiple application layer measurement configurations and (ii) a pause indicator related to the specific application layer measurement configuration,
wherein the pause indicator informs whether transmission of measurement reporting related to the specific application layer measurement configuration is paused or not;
based on the pause indicator informing that the transmission of measurement reporting related to the specific application layer measurement configuration is paused: suspend the measurement reporting related to the specific application layer measurement configuration; and store measurement results related to the specific application layer measurement configuration; and
based on the pause indicator informing that the transmission of measurement reporting related to the specific application layer measurement configuration is not paused: perform the transmission of measurement reporting related to the specific application layer measurement configuration.

11. The wireless device of claim 10,
wherein the pause indicator set to true informs that the transmission of measurement reporting related to the specific application layer measurement configuration is paused, and
wherein the pause indicator set to false informs that the transmission of measurement reporting related to the specific application layer measurement configuration is not paused.

12. A processor for a wireless device in a wireless communication system, wherein the processor is configured to control the wireless device to perform operations comprising:
receiving, from a radio access network (RAN) node, a configuration including multiple application layer measurement configurations;
receiving, from the RAN node, (i) information informing a specific application layer measurement configuration among the multiple application layer measurement configurations and (ii) a pause indicator related to the specific application layer measurement configuration, wherein the pause indicator informs whether transmission of measurement reporting related to the specific application layer measurement configuration is paused or not;

based on the pause indicator informing that the transmission of measurement reporting related to the specific application layer measurement configuration is paused: suspending the measurement reporting related to the specific application layer measurement configuration; and storing measurement results related to the specific application layer measurement configuration; and based on the pause indicator informing that the transmission of measurement reporting related to the specific application layer measurement configuration is not paused, performing the transmission of measurement reporting related to the specific application layer measurement configuration.

\* \* \* \* \*